United States Patent
Peterson et al.

(10) Patent No.: US 8,253,399 B2
(45) Date of Patent: Aug. 28, 2012

(54) RECONFIGURABLE REGULATOR AND ASSOCIATED METHOD

(75) Inventors: Kirk Peterson, Allen, TX (US); Qunying Li, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 860 days.

(21) Appl. No.: 12/273,055

(22) Filed: Nov. 18, 2008

(65) Prior Publication Data
US 2010/0123442 A1    May 20, 2010

(51) Int. Cl.
G05F 1/56   (2006.01)
G05F 1/565  (2006.01)
G05F 1/569  (2006.01)
G05F 1/575  (2006.01)

(52) U.S. Cl. ......... 323/282; 323/284; 323/271; 323/274

(58) Field of Classification Search ................ 323/224, 323/268, 271, 273, 274, 282, 284
See application file for complete search history.

(56) References Cited

U.S. PATENT DOCUMENTS

| | | | |
|---|---|---|---|
| 5,969,512 A * | 10/1999 | Matsuyama | 323/272 |
| 6,188,212 B1 * | 2/2001 | Larson et al. | 323/281 |
| 6,452,268 B1 * | 9/2002 | Huang | 257/730 |
| 6,489,756 B2 * | 12/2002 | Kanouda et al. | 323/284 |
| 6,724,174 B1 * | 4/2004 | Esteves et al. | 323/224 |
| 2005/0046405 A1 * | 3/2005 | Trafton et al. | 323/308 |

* cited by examiner

*Primary Examiner* — Matthew Nguyen
*Assistant Examiner* — Nusrat Quddus
(74) *Attorney, Agent, or Firm* — William B. Kempler; Wade J. Brady, III; Frederick J. Telecky, Jr.

(57) ABSTRACT

One embodiment of the invention includes a regulator system that includes a high-side power transistor electrically connected between a first node and a second node. The system also includes a low-side power transistor electrically connected between the second node and a third node. The high and low-side power transistors can be controlled by high and low-side control signals, respectively. A mode controller provides at least one mode control signal having a value to enable operation of the regulator system in each of a buck switching, boost switching, negative switching, and linear regulator mode. The regulator system can utilize at least one of the high-side power transistor and the low-side power transistor to operate in the selected mode depending on at least one of an input voltage and an arrangement of external circuitry that are electrically coupled to at least one of the first, second, and third nodes to provide a regulated output voltage.

17 Claims, 6 Drawing Sheets

RECONFIGURABLE REGULATOR AND ASSOCIATED METHOD

TECHNICAL FIELD

This invention relates to electronic circuits, and more specifically to a reconfigurable regulator and an associated method.

BACKGROUND

There is an ever increasing demand for power conversion and regulation circuitry to operate with increased efficiency and reduced power consumption to accommodate the continuous reduction in size of electronic portable devices. Many portable devices are battery powered, and it is desirable to utilize as little power as possible to operate these devices so that the battery life is extended. Regulators, such as switching regulators, have been implemented as an efficient mechanism for providing a regulated output in power supplies. As an example, a switching regulator controls the flow of power to a load by controlling the on and off duty-cycle of one or more switches coupled to the load.

Switching regulators can be classified according to the circuit topology. As an example, a buck switching regulator is configured to generate an output voltage having a magnitude that is less than the input voltage based on a switching duty-cycle of one or more power switches. Similarly, a boost switching regulator is configured to generate an output voltage having a magnitude that is greater than the input voltage based on a switching duty-cycle of one or more power switches. A negative switching regulator is configured to generate an output voltage having a negative magnitude relative to the input voltage based on a switching duty-cycle of one or more power switches. Furthermore, a linear regulator can generate an output voltage having a magnitude that is linearly controlled instead of based on the on and off-switching of power switches. These types of regulators can be included as an integrated circuit (IC). However, power switches within a given regulator can have a substantial size to support a large current flow, and can thus occupy a substantial area on a die that is fabricated as an IC.

SUMMARY

One embodiment of the invention includes a regulator system that includes a high-side power transistor electrically connected between a first node and a second node. The system also includes a low-side power transistor electrically connected between the second node and a third node. The high and low-side power transistors can be controlled by high and low-side control signals, respectively. A mode controller provides at least one mode control signal having a value to enable operation of the regulator system in each of a buck switching, boost switching, negative switching, and linear regulator mode. The regulator system can utilize at least one of the high-side power transistor and the low-side power transistor to operate in the selected mode depending on at least one of an input voltage and an arrangement of external circuitry that are electrically coupled to at least one of the first, second, and third nodes to provide a regulated output voltage.

Another embodiment of the invention includes a method for configuring a reconfigurable regulator integrated circuit (IC). The method includes decoding a mode select signal corresponding to a selected operating mode of the reconfigurable regulator IC to generate a plurality of mode control signals. The selected operating mode can be one of a buck switching regulator mode, a boost switching regulator mode, a negative switching regulator mode, and a linear regulator mode. The method also includes configuring the reconfigurable regulator IC in response to the plurality of mode control signals for the selected operating mode to generate at least one of a high-side control signal and a low-side control signal according to the selected operating mode. The method also includes controlling at least one of a first power transistor and a second power transistor in response to the at least one of the high-side control signal and the low-side control signal to provide a regulated output voltage in each of the buck switching regulator mode, the boost switching regulator mode, the negative switching regulator mode, and the linear regulator mode. The first power transistor can interconnect a first connection terminal and a second connection terminal and the second power transistor can interconnect the second connection terminal and a third connection terminal. The selected operating mode can depend on at least one of an input voltage and one or more external circuit devices coupled to at least some of the first connection terminal, the second connection terminal, and the third connection terminal.

Another embodiment of the invention includes a regulator integrated circuit (IC) that is configurable to operate in a selected operating mode comprising a buck switching regulator mode, a boost switching regulator mode, a negative switching regulator mode, and a linear regulator mode. The regulator IC includes means for coupling at least one of an input voltage and a plurality of external circuit devices to the regulator IC. The at least one of the input voltage and the plurality of external circuit devices can be configured to generate an output voltage based on the operation of at least one of a high-side power transistor and a low-side power transistor. The regulator IC also includes means for generating a high-side switching signal to control the high-side power transistor in each of the buck switching regulator mode, the boost switching regulator mode, the negative switching regulator mode and means for generating a low-side switching signal to control the low-side power transistor in each of the buck switching regulator mode, the boost switching regulator mode, the negative switching regulator mode. The regulator IC further includes means for generating an error voltage based on a magnitude of an output voltage relative to a reference voltage. The error voltage being provided to the means for generating the high and low-side switching signals in each of the buck switching regulator mode, the boost switching regulator mode, the negative switching regulator mode, and to the high-side power transistor in the linear regulator mode to regulate the output voltage according to the selected operating mode.

DETAILED DESCRIPTION

The present invention relates to electronic circuits, and more specifically to a reconfigurable regulator system. The reconfigurable regulator system can be implemented as an integrated circuit (IC) that can be configured to implement a selected set of regulator topologies by altering the connections of the external (i.e., off-chip) devices and selecting the regulator system operating mode. For example, the reconfigurable regulator can be configured to operate as a buck switching regulator, a boost switching regulator, a negative switching regulator, and a linear voltage regulator. The system can be implemented on an IC to include drive circuitry and a controller that are designed to be shared by the different configurations, which can be set according to the operating mode of the regulator system. For example, the regulator system can be designed such that at least about 90% of the active core circuitry is shared for at least three of the different modes.

As a further example, the regulator system can include a mode controller that is configured to decode a mode selection signal to generate a mode control signal that indicates a mode of operation for the regulator. For example, the mode control signals can be provided to a high-side driver and a low-side driver to configure the high and low-side drivers to operate in one of the regulator modes. An error amplifier circuit can generate an error voltage based on a magnitude of the regulator system output voltage relative to a reference voltage. The error voltage can be provided to a switching circuit and the high and low-side drivers to set a duty-cycle of respective high and low-side switching signals for controlling the high and low-side power transistors.

As another example, the mode control signals can deactivate the high and low-side drivers and can couple the error voltage directly to the high-side power transistor, such as for the linear regulator mode to provide for linear regulation of the output voltage based on the reference voltage. It will be appreciated that the reconfigurable regulator system can be configured to operate in any of the buck switching, boost switching, negative switching, and linear regulator modes with only two power transistors. The reconfiguration regulator system can also provide operating versatility in a small die-area package as compared to many other systems.

Figure 1:
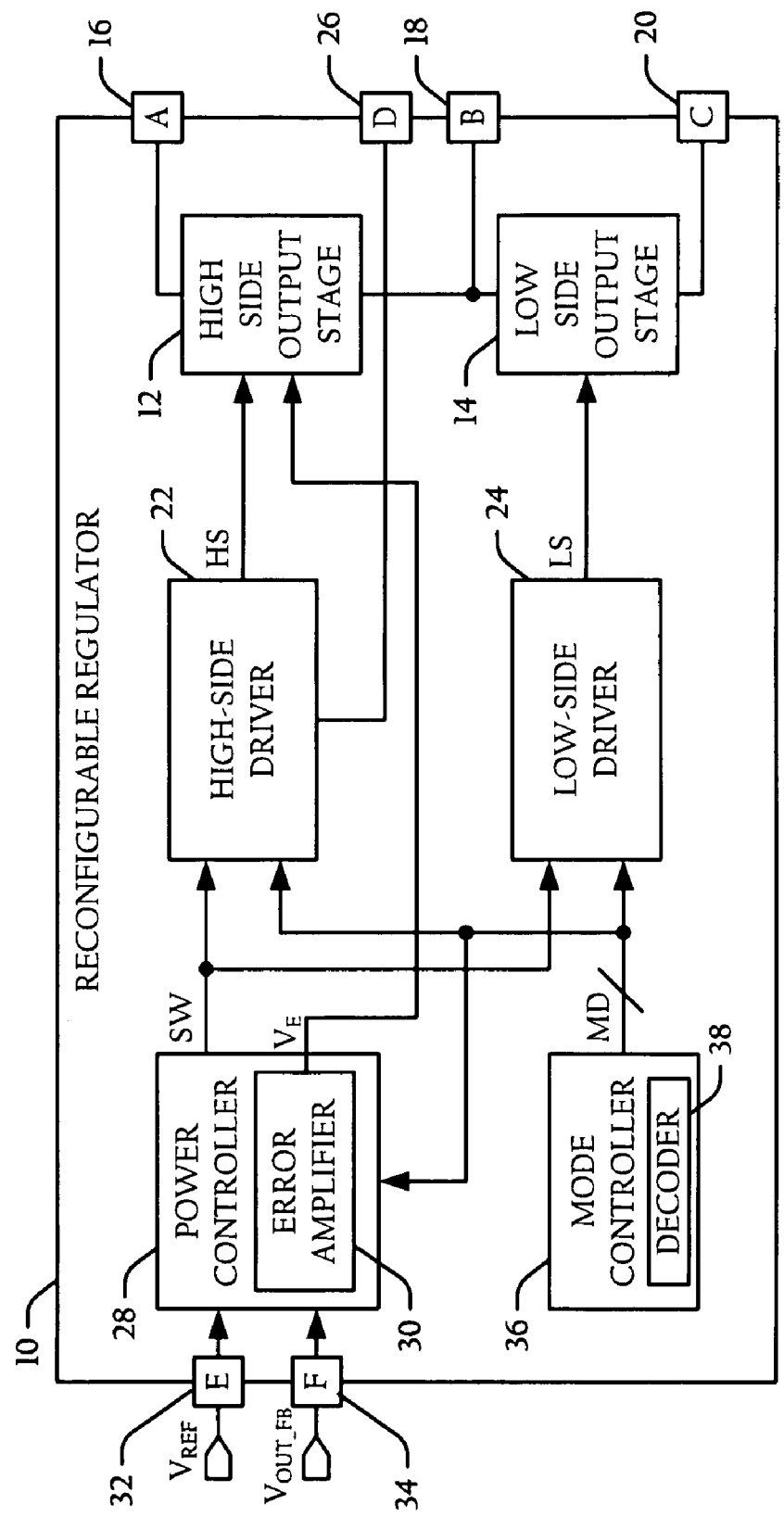
FIG. 1 illustrates an example of a reconfigurable regulator system in accordance with an aspect of the invention.

FIG. 1 illustrates an example of a reconfigurable regulator system 10 in accordance with an aspect of the invention. The regulator system 10 can be implemented as an integrated circuit (IC). As demonstrated herein, the reconfigurable regulator system 10 can be configured and reconfigured to operate in any one of a buck switching regulator mode, a boost switching regulator mode, a negative switching regulator mode, and a linear regulator mode. Because of the adaptability of the system 10, the reconfigurable regulator system 10 can be implemented in any of a variety of electronic devices, such as portable communication devices and laptop computers.

The reconfigurable regulator system 10 includes a high-side output stage 12 and a low-side output stage 14. As an example, the high-side output stage 12 and the low-side output stage 14 can each be configured as an arrangement of one or more power transistors, such as including an N-channel laterally-diffused metal-oxide semiconductor (LDMOS) transistor. In one example implementation, the reconfigurable regulator system 10 can be implemented as including only two power switching transistors (e.g., one for each of the output stages 12 and 14) to achieve a minimum area implementation. The high-side output stage 12 interconnects a first node 16 and a second node 18, demonstrated as "A" and "B", respectively, in the example of FIG. 1. Similarly, the low-side output stage 14 interconnects the second node 18 and a third node 20, demonstrated as "C" in the example of FIG. 1.

As an example, the nodes 16, 18, and 20 can be external connection pins on the IC that includes the reconfigurable regulator system 10. Therefore, an input voltage and/or an arrangement of external circuit devices (not shown) can be coupled to the pins corresponding to the nodes 16, 18, and 20, such as by a consumer. Depending on the application requirements of the system 10, reconfigurable regulator system 10 can operate in a specific power regulation mode. For example, based on the manner in which the input voltage and/or the arrangement of external circuit devices are coupled to the nodes 16, 18, and 20, the reconfigurable regulator system 10 can operate as one of a buck switching, boost switching, negative switching, or linear regulator to regulate an output voltage. The output voltage can be provided at one of the nodes 16, 18, or 20, or can be provided across one of the coupled external circuit devices.

The reconfigurable regulator system 10 also includes a high-side driver 22 and a low-side driver 24. The high-side driver 22 is configured to provide a high-side switching signal HS to the high-side output stage 12 and the low-side driver 24 is configured to provide a low-side switching signal LS to the low-side output stage 14. As an example, the high and low-side switching signals HS and LS can each have a duty-cycle that defines respective activation times of the power transistors in the high and low-side output stages 12 and 14 according to the buck switching, boost switching, or negative switching modes. In this way, the output voltage can be efficiently regulated based on the reconfigurable regulator system 10 operating as a switching regulator. In the example of FIG. 1, a fourth node 26, demonstrated as "D", is coupled to the high-side driver 22. As an example, an external capacitor (not shown) can be coupled to the fourth node 26 to operate the high-side output stage 12 and to maintain switching efficiency.

The reconfigurable regulator system 10 also includes a power controller 28. The power controller 28 is configured to generate a switching control signal SW that is provided to each of the high and low-side drivers 22 and 24. The switching control signal SW can be a trigger signal, such that the high and low-side drivers 22 and 24 can generate the switching signals HS and LS based on the switching control signal SW. For instance, the switching control signal SW can define the duty-cycle of the high and low-side switching signals HS and LS in each of the buck switching, boost switching, and negative switching modes. As an example, the duty-cycle can be defined based on an error voltage $V_E$ that is generated by an error amplifier circuit 30. The error voltage $V_E$ can be generated based on a relative magnitude of a reference voltage $V_{REF}$ that is provided at a fifth node 32 and the regulator system output voltage $V_{OUT\_FB}$ that is fed-back to a sixth node 34. In the example of FIG. 1, the fifth and sixth nodes 32 and 34 are demonstrated as "E" and "F", respectively, and can correspond to pins of the IC implementing the regulator system 10. It is to be understood that the regulator system output voltage $V_{OUT\_FB}$ corresponds to the regulator system output voltage $V_{OUT}$ that is generated by the reconfigurable regulator system 10, and which is thus fed-back to the reconfigurable regulator system 10 as the voltage $V_{OUT\_FB}$.

The reconfigurable regulator system 10 further includes a mode controller 36. The mode controller 36 is configured to control the reconfigurable regulator system 10 in the selected operating mode, such as one of the buck switching, boost switching, negative switching, and linear regulator modes. The mode controller 36 can be programmed in any of ways. For example, the mode controller 36 can be programmed via an electrically-erasable programmable read-only memory (EEPROM) or any of a variety of non-volatile internal memories (e.g., an EPROM, flash memory, fuses), via an externally provided mode selection signal at one or more input pins corresponding to the desired operating mode, via digital control, such as from a master controller, via one or more selectable switches, or in any of a variety of other manners. The mode controller 36 can include a decoder 38 that can decode the mode selection signal to generate a mode control signal, demonstrated in the example of FIG. 1 as the mode control signal MD. The mode control signal MD can thus be one or more signals that are provided to one or more components of the reconfigurable regulator system 10. The mode controller thus provides the mode control signal MD with a value to configure the reconfigurable regulator system 10 to operate in the selected mode.

For example, the mode control signal MD can be provided to the high and low-side drivers 22 and 24. Accordingly, the operation of the high and low-side drivers 22 and 24 can be adjusted based on the selected operating mode for the reconfigurable regulator system 10. As a further example, the high-side driver 22 can switch between two or more predetermined voltage levels as the high voltage rail to maintain switching efficiency of the high-side output stage 12 in the boost switching regulator mode. As yet another example, the high and low-side drivers 22 and 24 can be substantially deactivated if the mode control signal indicates operation in the linear regulator mode. Thus, in the linear regulator mode, the mode control signal MD can cause the error voltage $V_E$ to be directly passed to the high-side output stage 12, such that the high-side output stage 12 can be controlled directly by the error voltage $V_E$ to provide the output voltage, such as demonstrated in greater detail below.

Because the reconfigurable regulator system 10 can be configured to operate in any of the buck switching, boost switching, negative switching, and linear regulator modes, the reconfigurable regulator system 10 offers power providing versatility in a single IC package. In addition, because the reconfigurable regulator system 10 is capable of operating in any of the buck switching, boost switching, negative switching, and linear regulator modes with only a single power transistor network (e.g., which may include one or more transistors) for each of the high and low-side output stages 12 and 14, die-area of the IC package in which the reconfigurable regulator system 10 is arranged can be small. However, the high and low-side drivers 22 and 24 can be designed in such a manner as to provide the high and low-side power transistors with a relatively higher gate-source voltage $V_{GS}$ (e.g., at least 3 volts) to maximize switching efficiency and minimize an on-state resistance of the power transistors, thus minimizing the die area of the power transistors. Accordingly, the reconfigurable regulator system 10 can be both smaller and more versatile than other configurable regulator systems.

It is to be understood that the reconfigurable regulator system 10 is not intended to be limited to the example of FIG. 1. For example, the reconfigurable regulator system 10 is demonstrated in the example of FIG. 1 for the sake of explanation simplicity. Therefore, a variety of interconnections and components have been simplified and/or omitted in the description of the example of FIG. 1. In addition, the reference voltage $V_{REF}$ is demonstrated in the example of FIG. 1 as being provided from an external source. However, it is to be understood that the reference voltage $V_{REF}$ can be generated internal to the reconfigurable regulator system 10. Therefore, those skilled in the art will understand and appreciate that the reconfigurable regulator system 10 can be configured in any of a variety of ways.

FIGS. 2-5 illustrate examples of different output configurations that can be implemented with a reconfigurable regulator system 52 in accordance with an aspect of the invention. As an example, the reconfigurable regulator system 52 can be substantially similar to the reconfigurable regulator system 10 demonstrated in the example of FIG. 1. Therefore, reference can be made to the reconfigurable regulator system 10 in the example of FIG. 1 in the following description of the examples of FIGS. 2-5. Additionally, like elements are identified using the same reference characters in the examples of FIGS. 2-5.

Figure 2:
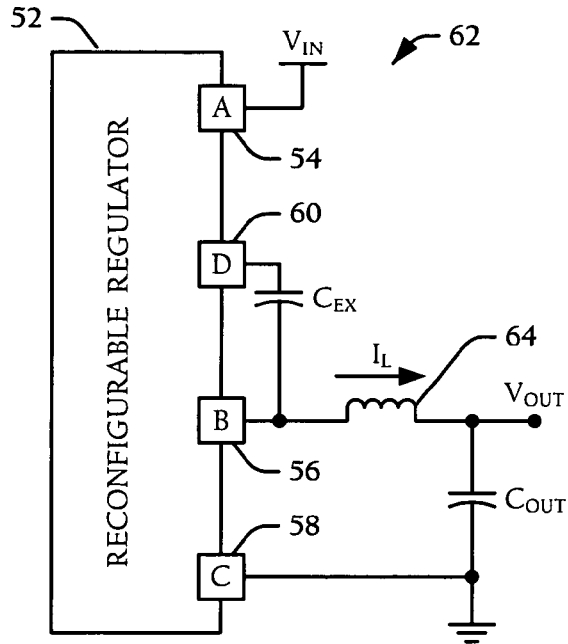
FIG. 2 illustrates an example of a diagram depicting a reconfigurable regulator system connected for a buck switching regulator mode in accordance with an aspect of the invention.

As an example, the reconfigurable regulator system 52 can be configured as an IC. In the example of FIG. 2, the reconfigurable regulator system 52 includes a first connection terminal 54, a second connection terminal 56, a third connection terminal 58, and a fourth connection terminal 60, demonstrated as "A" through "D", respectively. In the example of FIGS. 2-5, the internal components of the reconfigurable regulator system 52 are not demonstrated, but it is to be understood that the reconfigurable regulator system 52 can include a variety of components, such as substantially similar to those demonstrated in the example of FIG. 1 as well as other examples shown and described herein. For example, a high-side arrangement of transistors can interconnect the first and second connection terminals 54 and 56, similar to the high-side output stage 12 in the example of FIG. 1. Similarly, a low-side arrangement of transistors can interconnect the second and third connection terminals 56 and 58, similar to the low-side output stage 14 in the example of FIG. 1.

FIG. 2 demonstrates a first configuration 62 in which the reconfigurable regulator system 52 is configured in the buck switching regulator mode. In the first configuration 62, an input voltage $V_{IN}$ is coupled to the first connection terminal 54 and a low voltage power rail, demonstrated in the example of FIG. 2 as ground, is coupled to the third connection terminal 58. An inductor 64 is coupled to the second connection terminal 56, and an output voltage $V_{OUT}$ is generated at the output of the inductor 64. An output capacitor $C_{OUT}$ is connected between the output voltage $V_{OUT}$ and third connection terminal 58, which is coupled to ground. An external capacitor $C_{EX}$ is demonstrated as interconnecting the second and fourth connection terminals 56 and 60.

By way of example, in the buck switching regulator mode demonstrated by the first configuration 62, the input voltage $V_{IN}$ can be provided at a magnitude of approximately 5 volts to generate the output voltage $V_{OUT}$ at a magnitude of approximately 3.3 volts. As another example, the input voltage $V_{IN}$ can be provided at a magnitude of approximately 3.3 volts to generate the output voltage $V_{OUT}$ at a magnitude of approximately 2.5 volts. In the first configuration 62, the output voltage $V_{OUT}$ can be generated based on alternate switching of the high and low-side output stages 12 and 14 in response to the high and low-side switching signals HS and LS as generated by the high and low-side drivers 22 and 24 (FIG. 1). With reference back to FIG. 1, for example, upon the switching control signal SW being de-asserted (i.e., logic-low), the high-side driver 22 can assert the high-side switching signal HS to activate the high-side output stage 12 based on a charge stored on the external capacitor $C_{EX}$. In response, a current $I_L$ can flow from the connection terminal 54 (corresponding to the input voltage $V_{IN}$) through the HS output stage 12 out the second connection terminal 56 and through the inductor 64, thus generating the output voltage $V_{OUT}$ across a load (not shown) and charging the output capacitor $C_{OUT}$. Upon the switching control signal SW being asserted (i.e., logic-high), the high-side driver 22 can de-assert the high-side switching signal HS to deactivate the high-side output stage 12, and the low-side driver 24 can assert the low-side switching signal LS to activate the low-side output stage 14. In response, the current $I_L$ can flow from the third connection terminal 58 (corresponding to ground) through the low-side output stage 14 out the second connection terminal 56 and through the inductor 64, thus discharging the output capacitor $C_{OUT}$ to maintain the output voltage $V_{OUT}$ across the load.

Figure 3:
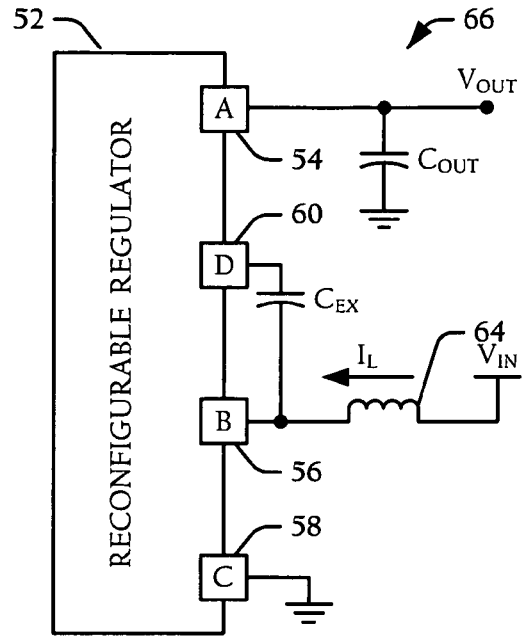
FIG. 3 illustrates an example of a diagram depicting a reconfigurable regulator system connected for a boost switching regulator mode in accordance with an aspect of the invention.

FIG. 3 demonstrates a second configuration 66 of the reconfigurable regulator system 52 that is configured in the boost switching regulator mode. In the second configuration 66, the inductor 64 is coupled between the second connection terminal 56 and the input voltage $V_{IN}$. Similar to the first configuration 62, the third connection terminal 58 is coupled to ground. In the second configuration 66, the output voltage $V_{OUT}$ is generated at the first connection terminal 54 across the output capacitor $C_{OUT}$, which is connected between the first connection terminal 54 and ground. Additionally, similar to the first configuration 62 of FIG. 2, the external capacitor $C_{EX}$ interconnects the second and fourth connection terminals 56 and 60.

As an example, in the boost switching regulator mode demonstrated in FIG. 3, the input voltage $V_{IN}$ can be provided at a magnitude of approximately 1.8 volts to generate the output voltage $V_{OUT}$ at a magnitude of approximately 3.3 volts. Similar to the first configuration 62 of FIG. 2, in the second configuration 66, the output voltage $V_{OUT}$ can be generated based on alternate switching of the high and low-side output stages 12 and 14 in response to the high and low-side switching signals HS and LS as generated by the high and low-side drivers 22 and 24. For example, upon the switching control signal SW being de-asserted, the high-side driver 22 can assert the high-side switching signal HS to activate the high-side output stage 12 based on a charge stored on the external capacitor $C_{EX}$. In response, the current $I_L$ can flow from the input voltage $V_{IN}$ though the inductor 64 and through the second connection terminal 56 through the high-side output stage 12, thus charging the output capacitor $C_{OUT}$ to generate the output voltage $V_{OUT}$ across the load. Upon the switching control signal SW being asserted, the high-side driver 22 can de-assert the high-side switching signal HS to deactivate the high-side output stage 12, and the low-side driver 24 can concurrently assert the low-side switching signal LS to activate the low-side output stage 14. In response, the current $I_L$ can flow from the input voltage $V_{IN}$ though the inductor 64 through the connection and through the low-side output stage to ground, thus building the inductance current $I_L$ (i.e., storing energy in the inductor 64) for charging the output capacitor $C_{OUT}$ in the next cycle. Meanwhile, the output capacitor is discharged and the output voltage $V_{OUT}$ ramps down due to the current that is pulled by the load until the next cycle when the output capacitor $C_{OUT}$ is charged again.

Figure 4:
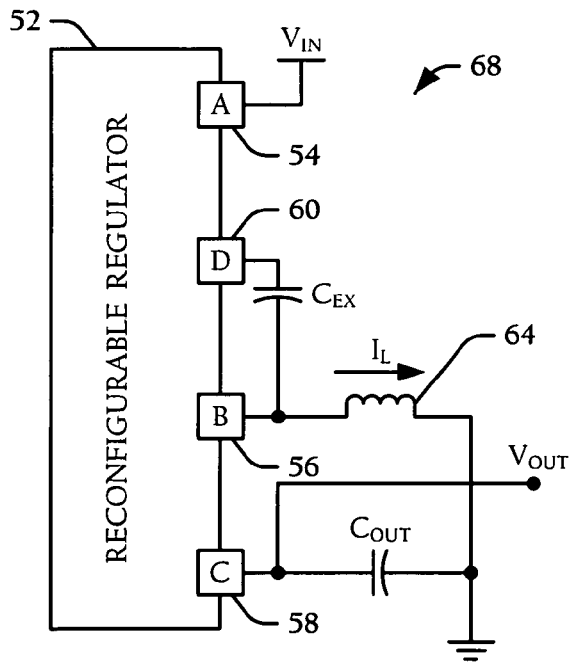
FIG. 4 illustrates an example of a diagram depicting a reconfigurable regulator system connected for a negative switching regulator mode in accordance with an aspect of the invention.

FIG. 4 depicts an example of a third configuration 68 of the reconfigurable regulator system 52 configured in the negative switching regulator mode. In the third configuration 68, the input voltage $V_{IN}$ is coupled to the first connection terminal 54. The output capacitor $C_{OUT}$ is connected between the third connection terminal 58 and ground. The inductor 64 is coupled to the second connection terminal 56 and ground. The output voltage $V_{OUT}$ is generated at the third connection terminal 58, corresponding to the voltage across the output capacitor $C_{OUT}$. Similar to the first and second configurations 62 and 66 of FIGS. 2 and 3, respectively, the external capacitor $C_{EX}$ is demonstrated as interconnecting the second and fourth connection terminals 56 and 60.

As an example, in the negative switching regulator mode demonstrated by the third configuration 68, the input voltage $V_{IN}$ can be provided at a magnitude of approximately 5 volts to generate the negative output voltage $-V_{OUT}$ at a magnitude of approximately −3 volts. Similar to the first and second configurations 62 and 66, in the third configuration 68, the output voltage $V_{OUT}$ can be generated based on alternate switching of the high and low-side output stages 12 and 14 in response to the high and low-side switching signals HS and LS as generated by the high and low-side drivers 22 and 24. For example, upon the switching control signal SW being de-asserted, the high-side driver 22 can assert the high-side switching signal HS to activate the high-side output stage 12 based on a charge stored on the external capacitor $C_{EX}$. In response, the current $I_L$ can flow from the input voltage $V_{IN}$ through the first connection terminal 54 and the high-side output stage 12 though the inductor 64 connected at second connection terminal 56, thus building the inductance current $I_L$ to store energy in the inductor 64. During this switching phase, the output capacitor $C_{OUT}$ also discharges to maintain the regulated output voltage $V_{OUT}$ across the load. Upon the switching control signal SW being asserted, the high-side driver 22 can de-assert the high-side switching signal HS to deactivate the high-side output stage 12, and the low-side driver 24 can assert the low-side switching signal LS to activate the low-side output stage 14. In response, the current $I_L$ can be maintained through the inductor 64 based on the current $I_L$ flowing from ground through the low-side output stage 14, thereby maintaining the output voltage $V_{OUT}$ across the load. The output capacitor $C_{OUT}$ is charged while the current $I_L$ flows from ground through the low-side output stage 14.

Figure 5:
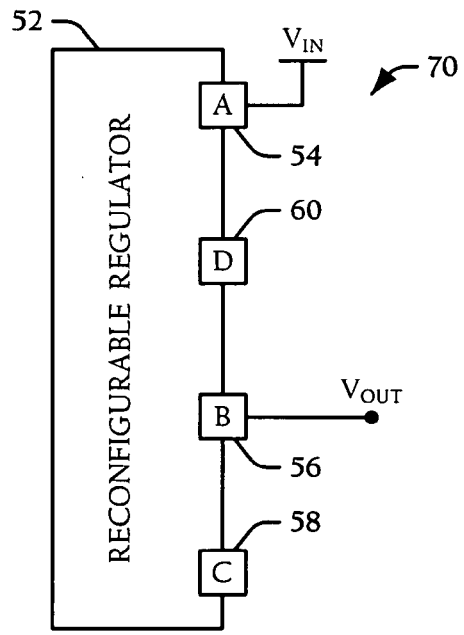
FIG. 5 illustrates an example of a diagram depicting a reconfigurable regulator system connected for a linear regulator mode in accordance with an aspect of the invention.

FIG. 5 demonstrates a fourth configuration 70 that can be implemented by the reconfigurable regulator system 52 to provide the linear regulator mode. In the fourth configuration 70, the input voltage $V_{IN}$ is coupled to the first connection terminal 54 and the output voltage $V_{OUT}$ is generated at the second connection terminal 56. Because the reconfigurable regulator system 52 is not operating in a switching regulator mode, but instead operates in the linear regulator mode of the fourth configuration 70, no additional external circuit devices are coupled to the reconfigurable regulator system 52.

As an example, in the linear regulator mode demonstrated by the fourth configuration 70 of FIG. 5, the input voltage $V_{IN}$ can be provided at a magnitude of approximately 5 volts to generate the output voltage $V_{OUT}$ at a magnitude of approximately 3.3 volts. However, the output voltage $V_{OUT}$ can be regulated linearly in the fourth configuration 70, such as in response to changes in the reference voltage $V_{REF}$, such as shown and described with respect to FIG. 1. With reference back to FIG. 1, in the fourth configuration 70, the mode control signal MD can be utilized to deactivate the high and low-side drivers 22 and 24. In addition, the mode control signal MD can cause circuitry to electrically couple the error voltage $V_E$ directly to a gate of a power transistor in the high-side output stage 12. As a result, the error voltage $V_E$ can directly control the high-side output stage 12, such as in the linear (i.e., triode) region. Accordingly, the output voltage $V_{OUT}$ can be regulated in the linear regulator mode based on the magnitude of the reference voltage $V_{REF}$.

It is to be understood that the arrangement of external circuit devices is not limited to the configurations 62, 66, 68, and 70 of FIGS. 2-5, respectively. For example, the external capacitor $C_{EX}$ need not be an externally-coupled component, but could be fabricated internal to an IC implementing the reconfigurable regulator system 52. As another example, one or more additional external circuit devices could be included in one or more of the configurations 62, 66, 68, and 70 in the example of FIGS. 2-5. Those skilled in the art will appreciate various other ways to configure the regulator system to generate a regulated output voltage $V_{OUT}$ based on the teachings contained herein.

Figure 6:
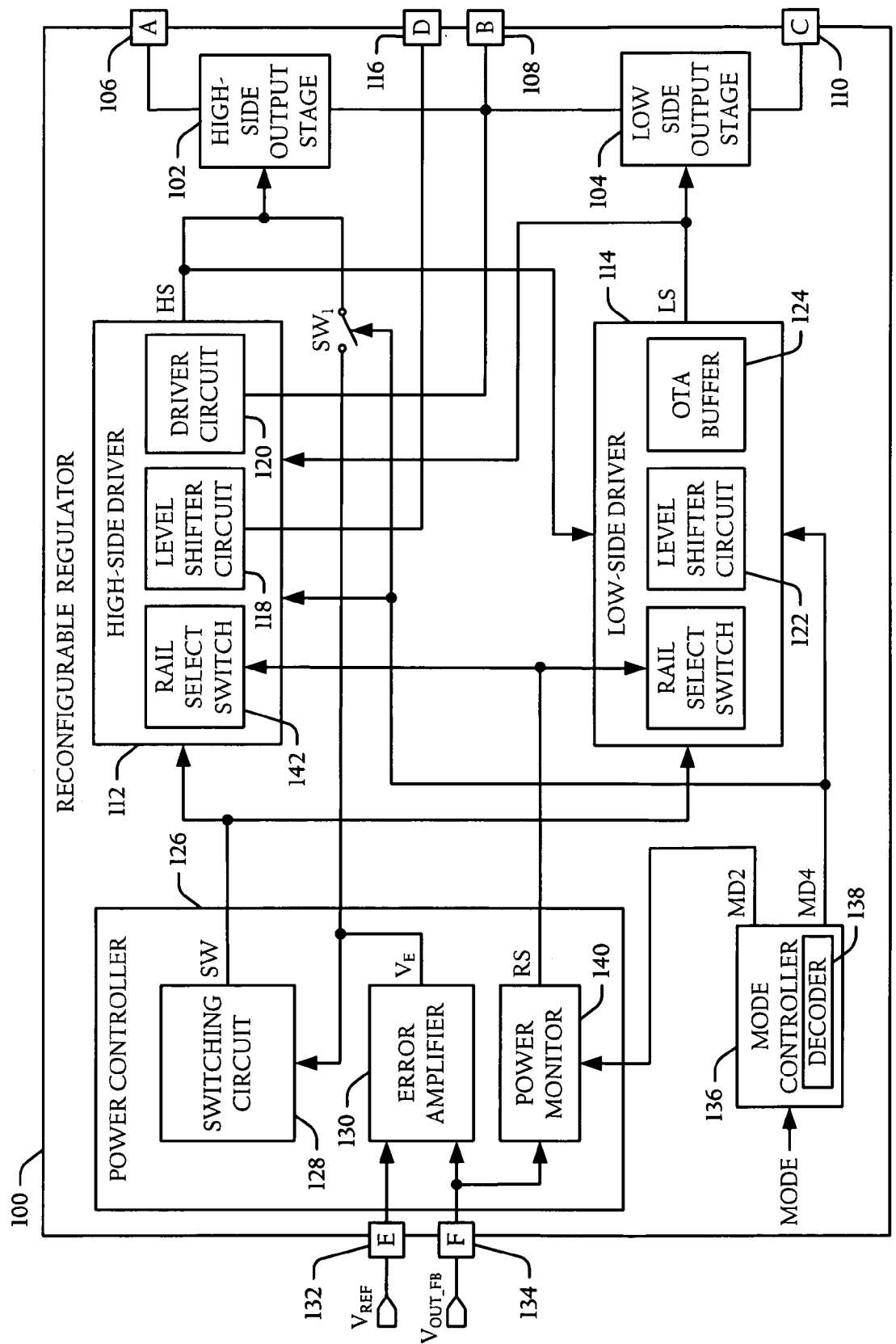
FIG. 6 illustrates another example of a reconfigurable regulator system in accordance with an aspect of the invention.

FIG. 6 illustrates another example of a reconfigurable regulator system 100 in accordance with an aspect of the invention. The reconfigurable regulator system 100 can be fabricated as an IC. As demonstrated herein, the reconfigurable regulator system 100 can be selectively configured to operate in any one of the buck switching regulator mode, the boost switching regulator mode, the negative switching regulator mode, and the linear regulator mode.

The reconfigurable regulator system 100 includes a high-side output stage 102 and a low-side output stage 104. As an example, the high-side output stage 102 and the low-side output stage 104 can each be configured as an arrangement of one or more power transistors, such as including an N-channel LDMOS transistor. In one example implementation, each the high-side and low-side output stages 102 and 104 includes a single power LDMOS transistor network (see, e.g., FIG. 8), such that only one pair transistor output stages is required to enable the multiple modes of operation. The high-side output stage 102 interconnects a first connection terminal 106 and a second connection terminal 108, demonstrated as nodes "A" and "B", respectively, in the example of FIG. 6. Similarly, the low-side output stage 104 interconnects the second connection node 108 and a third connection terminal 110, demonstrated as node "C" in the example of FIG. 6.

The connection terminals 106, 108, and 110 can be external connection pins on the IC that includes the reconfigurable regulator system 100. Therefore, an input voltage and/or an arrangement of external circuit devices (not shown), such as similar to as described in the examples of FIGS. 2-5, can be coupled to the corresponding to connection terminals 106, 108, and 110 depending on a user's desired regulator topology. For example, the reconfigurable regulator system 100 is configured to operate in one of the buck switching, boost switching, negative switching, or linear regulator modes to regulate an output voltage, such as demonstrated in the example of FIGS. 2-5.

The reconfigurable regulator system 100 also includes a high-side driver 112 and a low-side driver 114. The high-side driver 112 is configured to provide a high-side switching signal HS to drive the high-side output stage 102 and the low-side driver 114 is configured to provide a low-side switching signal LS to drive the low-side output stage 104. As an example, the high and low-side switching signals HS and LS can each have a duty-cycle that defines respective activation times of the power transistors in the high and low-side output stages 102 and 104 in the buck switching, boost switching, or negative switching modes. In the example of FIG. 6, the high-side switching signal HS is provided to the low-side driver 114 and the low-side switching signal LS is provided to the high-side driver 112, such that the high and low-side drivers 112 and 114 can control the switching of the high and low-side output stages 102 and 104 relative to each other, such that the high and low-side output stages 102 and 104 are not concurrently activated to prevent shoot-through current. Therefore, the output voltage $V_{OUT}$ can be efficiently regulated based on the reconfigurable regulator system 10 operating as a switching regulator.

In the example of FIG. 6, a fourth connection terminal 116, demonstrated as "D", is coupled to the high-side driver 112. As an example, an external capacitor (not shown) can be coupled to the fourth connection terminal 116 to maintain switching efficiency of the high-side output stage 102. For example, the external capacitor can be pre-charged in one switching phase, and the pre-charged voltage on the external capacitor can be used to raise a gate-source voltage $V_{GS}$ of the power transistor in the high-side output stage 102 to activate the power transistor. The pre-charge voltage of the external capacitor can set the gate-source voltage $V_{GS}$ of the power transistor to exceed a threshold voltage (e.g., 3 volts) to keep the on-state resistance of the power transistor low enough to achieve required regulator efficiency.

In the example of FIG. 6, the high-side driver 112 includes a level-shifter circuit 118 and a driver circuit 120. As an example, the high-side driver 112 can generate the high-side switching signal HS in response to a switching control signal SW that can be referenced in a low-side domain. For instance, the switching control signal SW can be a modulated control signal that switches between a magnitude of approximately 0 volts and the magnitude of the input voltage $V_{IN}$. However, because a source of the high-side output stage (e.g., LDMOS transistor) 102 may be referenced to a voltage that is approximately equal to the input voltage $V_{IN}$, the voltage magnitude of the switching control signal SW may be insufficient to activate the high-side output stage 102. The level-shifter circuit 118 is therefore configured to shift the reference of the switching control signal SW to a magnitude that is between approximately $V_{IN}$ and approximately $2*V_{IN}$ as to maintain switching efficiency of the high-side output stage 102. As an example, the level-shifter circuit 118 can charge the external capacitor $C_{EX}$ coupled to the fourth connection terminal (terminal "D") 116 to level-shift the switching control signal SW. The driver circuit 120 is configured to drive the level-shifted magnitude of the switching control signal SW to generate the high-side switching signal HS, as referenced to the voltage at the second connection terminal 108, for activation of the high-side output stage 102.

The low-side driver 114 can also include a level-shifter circuit 122 and an operational transconductance amplifier (OTA) buffer 124. As an example, the low-side driver 114 can generate the low-side switching signal LS in response to the switching control signal SW, which can modulate between a magnitude of approximately 0 volts and the magnitude of the input voltage $V_{IN}$, as described above. However, a source of the low-side output stage (e.g., LDMOS transistor) 104 may be referenced to a voltage that is less than 0 volts, such as in the negative switching regulator mode. Thus, the zero volt logic-low state of the switching control signal SW may be too high to deactivate the low-side output stage 104. The level-shifter circuit 122 is therefore configured to shift the reference of the switching control signal SW to a magnitude of between the source voltage of the low-side output stage 104 at a logic-low state and a magnitude sufficient to activate the low-side output stage 104 efficiently at a logic-high state. As an example, for a switching control signal SW that modulates between 0 volts and 5 volts, the low-side switching signal LS can switch between −3 volts and 2 volts in the negative switching regulator mode. The OTA buffer 124 is configured to buffer the level-shifted magnitude of the switching control signal SW to generate the low-side switching signal LS for controlling activation and deactivation of the low-side output stage 104.

The reconfigurable regulator system 100 also includes a power controller 126. The power controller 126 includes a switching circuit 128 and an error amplifier circuit 130. The switching circuit 128 is configured to generate the signal modulated SW that is provided to control each of the high and low-side drivers 112 and 114, such as for the generation of the high and low-side switching signals HS and LS. The error amplifier circuit 130 is configured to generate an error voltage $V_E$ based on a magnitude of the regulator system output voltage $V_{OUT}$ relative to a reference voltage $V_{REF}$. In the example of FIG. 6, the reference voltage $V_{REF}$ is provided at a fifth connection terminal 132, demonstrated as "E". The regulator system output voltage $V_{OUT}$ can be fed-back to a sixth connection terminal 134, which is demonstrated as "F". Alternatively, depending on the mode of operation, the regulator system output voltage $V_{OUT}$ may be acquired from another terminal corresponding to another of the connection terminals 106, 108, 110, or 116.

As an example, the error amplifier circuit 130 generates the error voltage $V_E$ based on the difference between the output voltage $V_{OUT}$ and the reference voltage $V_{REF}$. The error voltage $V_E$ is provided to the switching circuit 128 to define the duty-cycle of the switching control signal SW, which can thus define the respective duty-cycles of the high and low-side switching signals HS and LS in the buck switching, boost switching, and negative switching modes. As an example, the switching circuit 128 can include a comparator that compares the error voltage $V_E$ with a ramp signal (or other oscillating signal) to set the duty-cycle of the switching control signal SW.

The reconfigurable regulator system 100 further includes a mode controller 136. In the example of FIG. 6, the mode controller 136 receives a mode selection signal MODE. The mode selection signal MODE can correspond to a digital input signal having a value that defines the selected operating mode for the reconfigurable regulator system 100, such as one of the buck switching, boost switching, negative switching, and linear regulator modes. As an example, the mode controller 136 can include a decoder 138 that decodes the mode selection signal MODE to configure the reconfigurable regulator system 100 to operate in the selected mode. The mode controller 136 thus generates decoded mode control signals, such as including signals MD2 and MD4. In the example of FIG. 6, the signal MD2 corresponds to the boost switching regulator mode and the signal MD4 corresponds to the linear regulator mode. However, it is to be understood that the mode controller 136 can generate one or more decoded signals for each of the buck switching, boost switching, negative switching, and/or linear regulator modes.

The mode control signals MD2 and MD4 are provided to the various components of the reconfigurable regulator system 100 to configure the reconfigurable regulator system 100 to operate in the selected mode. As demonstrated in the example of FIG. 6, the mode control signal MD2 is provided to a power monitor 140 in the power controller 126. The power monitor 140 is configured to monitor a magnitude of the output voltage $V_{OUT}$, such as upon initialization of the reconfigurable regulator system 100 in the boost switching regulator mode. Upon the output voltage $V_{OUT}$ increasing to a predetermined threshold, the power monitor 140 can provide a signal RS to a rail select switch 142 in the high-side driver 112. The rail select switch 142 is configured to allow the high-side driver 112 to switch between two more different high voltage rails in the boost switching regulator mode based on the RS signal, such as described in greater detail in the example of FIG. 7. In addition, the mode control signal MD4 is provided to each of the high and low-side drivers 112 and 114 to enable or disable the high and low-side drivers 112 and 114. For instance, the high and low-side drivers are deactivated in the linear regulator mode. The mode control signal MD4 also activates a switch $SW_1$ that electrically couples the error voltage $V_E$ to a control input (e.g., a gate of the LDMOS transistor) of the high-side output stage 102, such that the error voltage $V_E$ controls the high-side output stage 102 in the linear regulator mode.

It is to be understood that the reconfigurable regulator system 100 is not intended to be limited to the simplified example of FIG. 6. In addition, the reference voltage $V_{REF}$ is demonstrated in the example of FIG. 6 as being provided from an external source. However, it is to be understood that the reference voltage $V_{REF}$ can be generated internal to the reconfigurable regulator system 100. Similarly, although the mode select signal MODE is demonstrated as being provided internally, such as from an EEPROM, it is to be understood that the mode select signal MODE could be provided externally. Additionally, the reconfigurable regulator system 100 could be configured such that the low-side output stage 104 is implemented to generate the output voltage $V_{OUT}$ based on the error voltage $V_E$ in the linear regulator mode, instead of the high-side output stage 102 as demonstrated in the example of FIG. 6.

Figure 7:
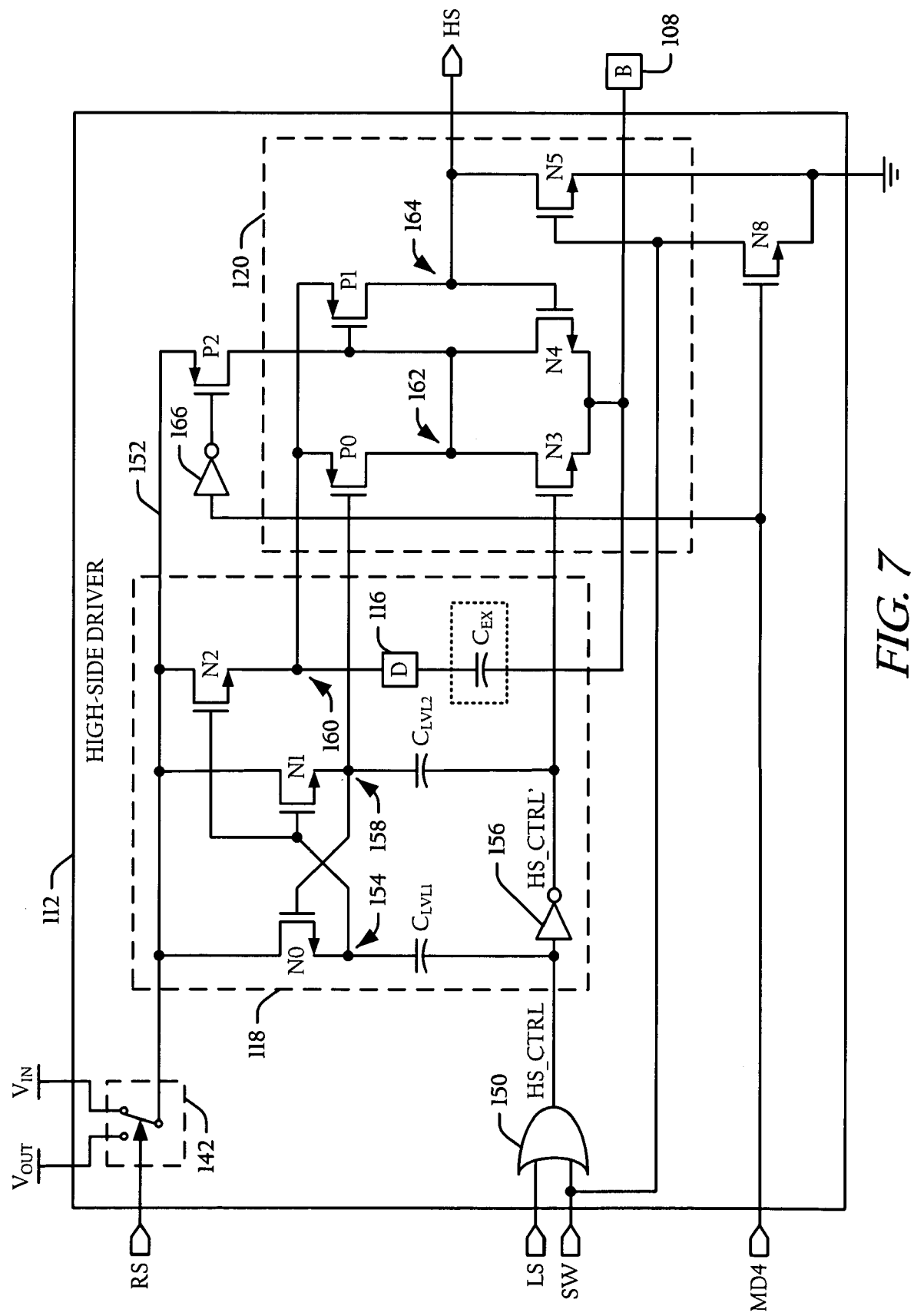
FIG. 7 illustrates an example of a high-side driver that can be implemented in a reconfigurable regulator system in accordance with an aspect of the invention.

FIG. 7 illustrates an example of the high-side driver 112 that can be implemented in reconfigurable regulator in accordance with an aspect of the invention. The high-side driver 112 of FIG. 7 can correspond to the high-side driver 112 in the example of FIG. 6. Like reference numbers are used in the example of FIG. 7 as corresponding to those features introduced in the example of FIG. 6. Reference thus can be made to the example of FIG. 6 in the following description of the example of FIG. 7 for additional context relating to the reconfigurable regulator.

The high-side driver 112 includes the level-shifter circuit 118 and driver circuit 120. The low-side switching signal LS provided from the low-side driver 114 and the switching control signal SW provided from the switching circuit 128 are each input to an OR-gate 150. The OR-gate provides an output signal HS_CTRL to the level-shifter circuit 118. The level-shifter circuit 118 includes a pair of capacitors $C_{LVL1}$ and $C_{LVL2}$, an inverter 156, and a pair of cross-coupled level-shifting N-channel field-effect transistors (N-FETs) N0 and N1, each having drains that are coupled to a high voltage rail node 152. The high voltage rail node 152 has a voltage that is set to either $V_{IN}$ or $V_{OUT}$, such as based on a rail select (RS) signal.

At the operation starting point of the reconfigurable regulator system 100, the initial voltage across both the capacitors $C_{LVL1}$ and $C_{LVL2}$ is approximately 0 volts. After a few clock cycles of the switching signal SW, the pair of capacitors $C_{LVL1}$ and $C_{LVL2}$ are charged to a magnitude that is approximately the same as the input voltage $V_{IN}$. Specifically, when HS_CTRL is asserted, a node 154 is set logic-high and a node 158 is set logic-low, resulting in deactivation of the N-FET N0 and activation of the N-FET N1. As a result, the top plate of the capacitor $C_{LVL2}$ is switched to the high voltage rail node 152 and the bottom plate of the capacitor $C_{LVL2}$ is coupled to a logic-low state of a signal HS_CTRL' (e.g., approximately 0 volts), thus charging the capacitor $C_{LVL2}$. Similarly, when HS_CTRL is de-asserted, the node 154 is set logic-low and the node 158 is set logic-high, thus activating the N-FET N0 and deactivating the N-FET N1. As a result, the top plate of capacitor $C_{LVL1}$ is switched to the high voltage rail node 152 and the bottom plate of $C_{LVL1}$ is coupled to a logic-low state of the signal HS_CTRL (e.g., approximately 0 volts), thus charging the capacitor $C_{LVL1}$. After a couple of switching cycles, a voltage magnitude of approximately $V_{IN}$ is charged across both capacitors $C_{LVL1}$ and $C_{LVL2}$. Therefore, when the signals HS_CTRL and HS_CTRL' oppositely toggle between approximately 0 volts and a voltage magnitude of approximately the input voltage $V_{IN}$, the nodes 154 and 158 oppositely toggle between a voltage magnitude of approximately $V_{IN}$ and a voltage magnitude of approximately $2*V_{IN}$, which are the voltages necessary to activate N_FET N2 charging the external capacitor $C_{EX}$ in one phase (when HS_CTRL is asserted) and deactivate the N_FET N2 to stop charging the external capacitor $C_{EX}$ in the other phase (when HS_CTRL is de-asserted).

Upon the switching control signal SW or the LS signal being asserted, the OR-gate 150 asserts the signal HS_CTRL. As a result, a voltage magnitude of a node 154 increases to approximately the magnitude of the input voltage $2*V_{IN}$ (e.g., $V_{IN}$ plus another pre-charged $V_{IN}$ on the $C_{LVL1}$) via the capacitor $C_{LVL1}$. The signal HS_CTRL is inverted by the inverter 156 to de-assert the signal HS_CTRL'. Thus, a voltage magnitude of a node 158 decreases to approximately $V_{IN}$ via the capacitor $C_{LVL2}$. Shortly after the time that the switching control signal SW is asserted, the low-side switching signal LS is also asserted, thus activating the low-side output stage 104 to couple the second and third connection terminals 108 and 110. The voltage magnitude at the second connection terminal 108 is approximately 0 volts in the buck switching and boost switching regulator modes, and less than 0 volts (e.g., −3 volts) in the negative switching regulator mode.

In the example of FIG. 7, the external capacitor $C_{EX}$ is demonstrated in phantom as interconnecting the second and fourth connection terminals 108 and 116. As a result, depending on the magnitude of the high voltage rail 152 relative to voltage at the second and fourth connection terminals 108 and 116, an N-FET N2 in the level-shifter circuit 118 is activated to begin charging the external capacitor $C_{EX}$. A node 160, corresponding to the source of the N-FET N2 and the fourth connection terminal 116, charges commensurate with the charging of $C_{EX}$ to a voltage magnitude that is approximately equal to the input voltage $V_{IN}$.

The driver circuit 120 includes a P-channel FET (P-FET) P0 having a gate coupled to the node 158 and which is interconnected between the node 160 and a node 162. The driver circuit 120 also includes a P-FET P1 having a gate coupled to the node 162 and which is interconnected between the node 160 and an output node 164 of the high-side driver 112 at which the high-side switching signal HS is generated. In addition, the driver circuit 120 includes a pair of N-FETs N3 and N4 connected in parallel between the node 162 and the second connection terminal 108. The N-FET N3 is controlled at a gate thereof by the signal HS_CTRL'. The N-FET N4 is controlled at a gate by the output node 164, which corresponds to the HS output signal. The driver circuit 120 also includes an N-FET N5 having a gate that is coupled to the switching control signal SW and which interconnects the output node 164 and ground.

Based on the voltage magnitude of the node 158 relative to the voltage at node 160, the P-FET P0 is activated to set a voltage magnitude of the node 162 to be approximately equal to the input voltage $V_{IN}$. As a result of the node 162 being set to $V_{IN}$ through P0 and N2, the P-FET P1 is deactivated. In addition, because the signal HS_CTRL' has a logic-low state, the N-FET N3 is likewise deactivated. Since the switching control signal SW is asserted in this example, the N-FET N5 is activated to couple the output node 164 to ground. Therefore, the high-side switching signal HS is set to a logic-low state, such as to deactivate the high-side output stage 102. In addition, the N-FET N4 is deactivated responsive to the coupling of the output node 164 to ground.

Figure 9:
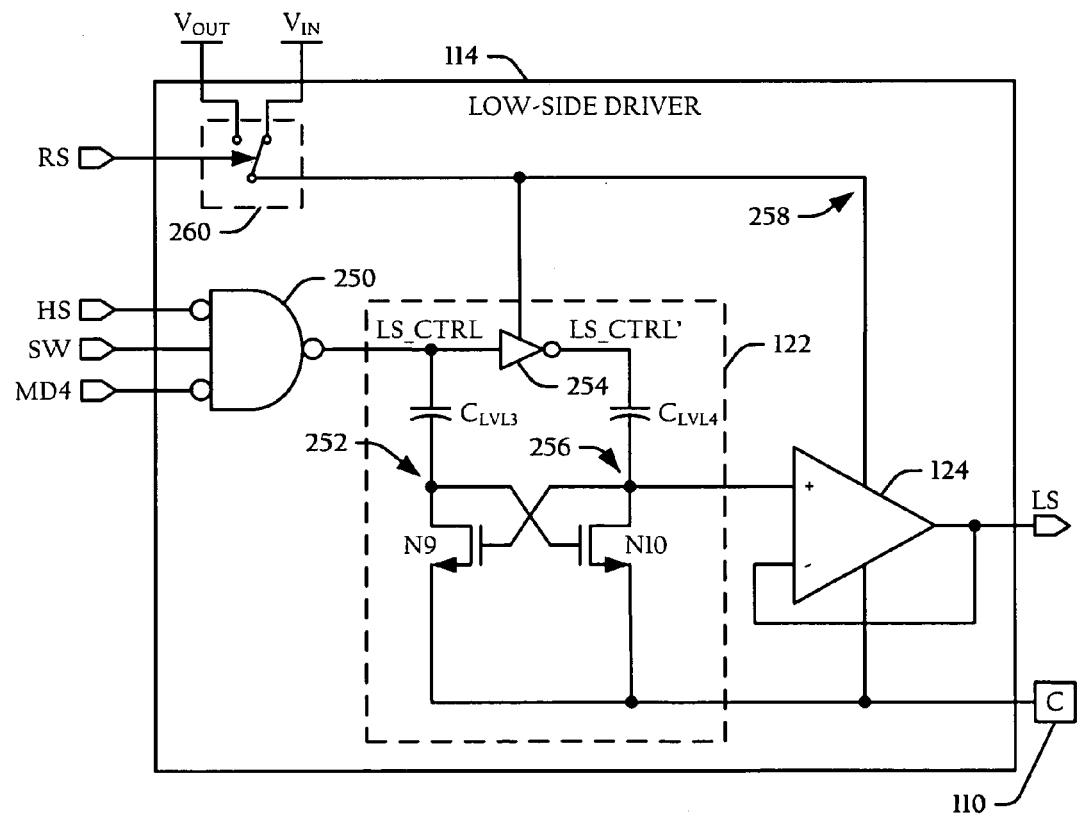
FIG. 9 illustrates an example of a low-side driver that can be implemented in a reconfigurable regulator system in accordance with an aspect of the invention.

As described further in the example of FIG. 9, the low-side switching signal LS is de-asserted shortly after (and in response to) the switching control signal SW is de-asserted. Upon the low-side switching signal LS being de-asserted, the signal HS_CTRL is likewise de-asserted and the signal HS_CTRL' is asserted via the inverter 156. As a result, the voltage magnitude of the node 154 decreases to approximately 0 volts and the voltage magnitude of the node 158 increases to approximately the input voltage $V_{IN}$. As a result, the N-FET N2 and the P-FET P0 each deactivate. However, as described above, the signal HS_CTRL' is asserted, thus activating the N-FET N3 to couple the node 162 to the second connection terminal 108. As a result, the P-FET P1 activates to couple the node 160 to the output node 164.

As described above, the external capacitor $C_{EX}$ charges to have a voltage across it that is approximately equal to the input voltage $V_{IN}$ while the switching control signal SW is asserted. As also described above with respect to FIG. 1, the voltage magnitude at the second connection terminal 108 is approximately equal to the voltage magnitude at the third connection terminal 110 while the switching control signal SW is asserted. However, upon the low-side switching signal LS being de-asserted, the voltage magnitude at the second connection terminal 108 increases to a magnitude that can be approximately equal to the input voltage $V_{IN}$. Therefore, the voltage across the external capacitor $C_{EX}$ (e.g., approximately equal to the input voltage $V_{IN}$) is provided as the gate-source voltage $V_{GS}$ of the high-side output stage 102 based on both the external capacitor $C_{EX}$ and the source of the high-side output stage 102 being referenced to approximately the input voltage $V_{IN}$. In other words, the voltage across the external capacitor $C_{EX}$, referenced to the second connection terminal 108 (i.e., the source of the high-side output stage 102), is applied to the output node 164 via the activated P-FET P1 and N2 to, in turn, activate the high-side output stage 102 in response to both the switching control signal SW and the low-side switching signal LS being de-asserted.

As an example, for efficient operation of a switching regulator, an on-resistance $R_{DS\_ON}$ of the high-side power transistor is typically desired to be very low (e.g., less than 0.3Ω). Therefore, based on the above description of the manner in which the high-side output stage 102 is activated, the level-shifter circuit 118 and the driver circuit 120 are configured to activate the high-side output stage 102 to substantially minimize the on-resistance $R_{DS\_ON}$ associated with the high-side output stage 102, such as by setting the on-resistance $R_{DS\_ON}$ to be approximately less than 0.3Ω. Specifically, the external capacitor $C_{EX}$ can be selected to have a large capacitance magnitude, such as ten times or more than the gate capacitance associated with the high-side output stage 102, based on the large size of the high-side output stage 102. Therefore, upon the de-assertion of the switching control signal SW and the low-side switching signal LS, when the charge of the external capacitor $C_{EX}$ is applied to the gate of the high-side output stage 102, the voltage provided by the external capacitor $C_{EX}$ can be sufficient to ensure a voltage loss across the high-side output stage 102 of less than one-tenth. Accordingly, the high-side driver 112 is configured to rapidly and effectively activate the high-side output stage 102 to maintain switching efficiency of the reconfigurable regulator system 100 in the buck switching, boost switching, and negative switching regulator modes.

In addition, because the voltage at the output node 164 is increased based on the voltage across the external capacitor $C_{EX}$, corresponding to high-side switching signal HS when P1 is activated, the N-FET N4 becomes activated. That is, when the switching control signal SW and the low-side switching signal LS are de-asserted, both of the N-FETs N3 and N4 are activated to couple the node 162 to the second connection terminal to facilitate and maintain the activation of the P-FET P1. However, the activation of the high-side output stage 102 results in an increase in the voltage of the second connection terminal ("B") 108, such that the gate-source voltage $V_{GS}$ of the N-FET N3 decreases. Such a decrease in the gate-source voltage $V_{GS}$ of the N-FET N3 could result in deactivation of the N-FET N3. Therefore, because the N-FET N4 is biased by the high-side switching signal HS relative to the voltage at the second connection terminal 108, the N-FET N4 operates as a latch to maintain activation of the P-FET P1, regardless of whether the N-FET N3 is deactivated by the increase in the second connection terminal 108.

The above description of the operation of the high-side driver 112 can be applicable to all three of the buck switching, boost switching, and negative switching regulator modes. However, in the boost switching regulator mode, the input voltage $V_{IN}$ is provided to the reconfigurable regulator system 100 at a small voltage magnitude (e.g., as low as 1.65 volts). As a result, the charge that is applied to the external capacitor $C_{EX}$ while the switching control signal SW is asserted is relatively small in comparison to the magnitude of the input voltage $V_{IN}$ in the buck switching or negative switching regulator modes.

Figure 8:
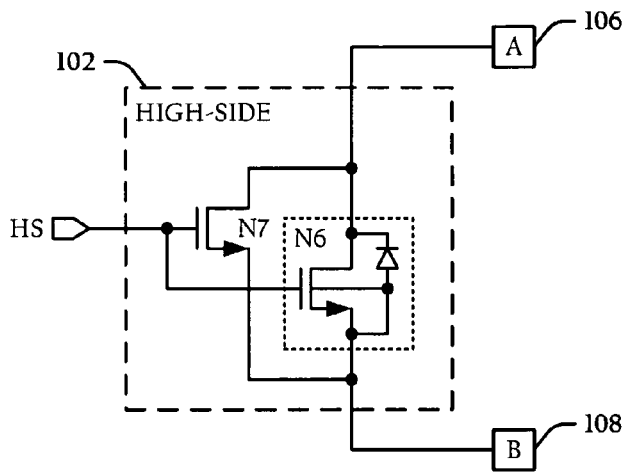
FIG. 8 illustrates an example of a high-side output stage that can be implemented in a reconfigurable regulator system in accordance with an aspect of the invention.

FIG. 8 illustrates an example of the high-side output stage 102 in accordance with an aspect of the invention. The high-side output stage 102 in the example of FIG. 8 can correspond to the high-side output stage 102 in the example of FIG. 6. Therefore, like reference numbers are used in the example of FIG. 8 to identify features previously introduced with respect to the example of FIG. 6. Reference thus can be made to the examples of FIGS. 6 and 7 for additional context in the following description of the example of FIG. 8.

The high-side output stage 102 includes an LDMOS FET N6 and an N-channel N-FET N7 that are coupled in parallel between the first and second connection terminals 106 and 108. The high-side switching signal HS, such as provided at the output node 164 of the driver circuit 120 in the example of FIG. 7, is provided to a gate of each of the LDMOS FET N6 and the N-FET N7. Therefore, the LDMOS FET N6 and the N-FET N7 are activated and deactivated substantially concurrently. It is to be understood that the low-side output stage 104 can be configured substantially similar to the high-side output stage 102 demonstrated in the example of FIG. 8, such as including a parallel LDMOS FET and N-FET, to achieve similar current flow characteristics as described herein.

As an example, the configuration of the LDMOS FET N6 can reduce the on-state resistance of the high-side output stage 102 and improve regulator efficiency. In addition, the LDMOS FET N6 can be designed to have an aspect ratio (W/L) that is larger than the N-FET N7, such as ten times larger. Therefore, the LDMOS FET N6 can have a significantly greater conductivity than the N-FET N7 for a given gate-source voltage $V_{GS}$ based on its configuration as an LDMOS and on the significantly larger aspect ratio. However, the threshold voltage $V_T$ for the N-FET N7 can be substantially less than the first N-FET N6. For example, the LDMOS FET N6 can have a threshold voltage $V_T$ that is approximately equal to 1.25 volts, while the threshold voltage $V_T$ of the N-FET N7 can be approximately 0.67 volts. Therefore, the N-FET N7 can improve conductivity of the high-side output stage 102 when the gate-source voltage $V_{GS}$ is relatively low, such as upon initial activation of the reconfigurable regulator system 100 when the input voltage $V_{IN}$ can be as low as 1.65 volts. Specifically, upon an initial activation of the reconfigurable regulator system 100 in the boost switching regulator mode, the conductivity of the high-side output stage 102 may still be less than desired for a desired regulator efficiency. However, the current flow through the high-side output stage 102 upon initialization of the reconfigurable regulator system 100 is low, such that the voltage drop across the high-side output stage 102 is likewise small to mitigate loss in regulator efficiency.

Referring back to the example of FIG. 7, the high-side driver 112 also includes the rail select switch 142. The rail select switch 142 is a switch that can couple the high voltage rail 152 to one of the input voltage $V_{IN}$ and the output voltage $V_{OUT}$ in response to the signal RS generated by the power monitor 140 demonstrated in the example of FIG. 6. The signal RS can be disabled (e.g., logic-low or zero volts) in the buck switching and negative regulator modes, such that the high voltage rail 152 is always coupled to the input voltage $V_{IN}$ in the buck switching and negative regulator modes. However, in the boost switching regulator mode, the power monitor 140 can be configured to continuously monitor the magnitude of the regulator output voltage $V_{OUT}$. Upon the output voltage $V_{OUT}$ achieving a sufficient magnitude, such as a predetermined threshold magnitude depending on application requirements, the power monitor 140 can assert the signal RS (e.g., a logic-high) to switch the high voltage rail 152 from the input voltage $V_{IN}$ to the output voltage $V_{OUT}$. As an example, the predetermined threshold magnitude could be a magnitude sufficient to achieve an on-resistance $R_{DS\_ON}$ of the high-side output stage 102 of 0.3Ω or less. Therefore, upon the output voltage $V_{OUT}$ achieving the predetermined threshold, the external capacitor $C_{EX}$ can be charged by the output voltage $V_{OUT}$ when the switching control signal SW is asserted, and can be applied as the gate-source voltage $V_{GS}$ of the high-side output stage 102 when the switching control signal SW is de-asserted to achieve the desired efficiency. Accordingly, in the boost mode, the reconfigurable regulator system 100 can operate with relatively low efficiency during an initial ramp-up time (e.g., 0.2 ms), but can subsequently operate at high-efficiency after the initial ramp-up time and the high voltage rail 152 is switched from the input voltage $V_{IN}$ to the output voltage $V_{OUT}$.

With continued reference to FIG. 7, the high-side driver 112 also includes a P-FET P2 and an N-FET N8. The P-FET P2 has a source coupled to the high voltage rail 152 and a drain coupled to the node 162, and the N-FET N8 has a drain coupled to the gate of the N-FET N5 and a source coupled to ground. The N-FET N8 has a gate that is controlled directly by the signal MD4 and the P-FET P2 has a gate that is controlled by the signal MD4 via an inverter 166. As an example, as demonstrated in the example of FIG. 6, the mode controller 136 can decode the mode select signal MODE corresponding to the linear regulator mode to assert the signal MD4. As a result, the asserted signal MD4 activates both of the P-FET P2 and the N-FET N8. Therefore, the P-FET P1 and the N-FET N5 are both held in a deactivated state. In addition, with reference to the example of FIG. 6, the signal MD4 also closes the switch $SW_1$ to couple the input of the high-side output stage 102 to the error voltage $V_E$ generated by the error amplifier circuit 130. As a result, the high-side output stage 102 can be operated to provide the output voltage $V_{OUT}$ at the second connection terminal 108 based on the input voltage $V_{IN}$ provided at the first connection terminal 106, as demonstrated in the configuration 70 in the example of FIG. 5. Accordingly, the high-side driver 112 is substantially deactivated upon the reconfigurable regulator system 100 being configured in the linear regulator mode.

It is to be understood that the high-side driver 112 is not intended to be limited to the example of FIG. 7. For example, the level-shifter circuit 118 and the driver circuit 120 are not limited to the configurations demonstrated in the example of FIG. 7, but other level-shifting and driving configurations can be implemented in the high-side driver 112. As another example, the manner in which the high-side driver 112 is deactivated in the linear regulator mode is not limited to the use of the P-FET P2 and the N-FET N8. Thus, other arrangements of switches and/or transistors can be implemented to provide the linear regulator mode via the high-side output stage 102. Those skilled in the art may understand and appreciate other variations in the circuit within the scope of this application.

FIG. 9 illustrates an example of the low-side driver 114 that can be utilized in a reconfigurable regulator in accordance with an aspect of the invention. The low-side driver 114 in the example of FIG. 9 can correspond to the low-side driver 114 in the example of FIG. 6. Therefore, like reference numbers are used in the example of FIG. 6 to identify corresponding features previously introduced in the example of FIG. 6, and reference can be made to the example of FIG. 6 for additional context in the following description of the example of FIG. 9.

The low-side driver 114 includes the level-shifter circuit 122 and the OTA buffer 124. The high-side switching signal HS generated by the high-side driver 112 is provided to a first, inverting input of the NAND-gate 250, the switching control signal SW generated by the switching circuit 128 is provided to a second input of an NAND-gate 250, and the mode control signal MD4 generated by the mode controller 136 is provided to a third, inverting input of the of the NAND-gate 250. In the example of FIG. 9, the NAND-gate 250 provides an output signal LS_CTRL to an input of the level-shifter circuit 122. The level-shifter circuit 122 includes an inverter 254, a pair of cross-coupled capacitors $C_{LVL3}$ and $C_{LVL4}$, and a pair of cross-coupled level-shifting N-FETs N9 and N10 having sources that are each coupled to the third connection terminal 110.

At the operation starting point of the reconfigurable regulator system 100, the initial voltage across both the capacitors $C_{LVL3}$ and $C_{LVL4}$ is approximately 0 volts. After a few clock cycles of the switching signal SW, the pair of capacitors $C_{LVL1}$ and $C_{LVL2}$ are charged to a magnitude that is approximately the same as the output voltage $V_{OUT}$. Specifically, when LS_CTRL is asserted, a node 252 is set logic-high and a node 256 is set logic-low, resulting in deactivation of the N-FET N9 and activation of the N-FET N10. As a result, the top plate of the capacitor $C_{LVL4}$ is coupled to a logic-low state of the signal LS_CTRL' (i.e., via the inverter 254) and the bottom plate of the capacitor $C_{LVL4}$ is switched to the third connection terminal 110 (e.g., approximately 0 volts in the buck switching and boost switching regulator modes, and approximately $-V_{OUT}$ in the negative switching regulator mode), thus charging the capacitor $C_{LVL4}$. Similarly, when LS_CTRL is de-asserted, the node 252 is set logic-low and the node 256 is set logic-high, thus activating the N-FET N9 and deactivating the N-FET N10. As a result, the top plate of capacitor $C_{LVL3}$ is coupled to a logic-low state of the signal LS_CTRL and the bottom plate of $C_{LVL3}$ is switched to the third connection terminal 110 (e.g., approximately 0 volts or approximately $-V_{OUT}$), thus charging the capacitor $C_{LVL3}$. After a couple of switching cycles, a voltage magnitude of approximately $V_{OUT}$ is charged across both capacitors $C_{LVL3}$ and $C_{LVL4}$. Therefore, when the signals LS_CTRL and LS_CTRL' oppositely toggle between approximately zero volts and a voltage magnitude of approximately the input voltage $V_{IN}$, the nodes 252 and 256 oppositely toggle between a voltage magnitude of approximately ($V_{IN}$ minus $V_{OUT}$) and a voltage magnitude of approximately $-V_{OUT}$, which are the voltages necessary to activate and deactivate the low-side output stage 104. It is to be understood that, in the buck switching and boost switching regulator modes, the voltage magnitude of approximately $-V_{OUT}$ can be approximately zero volts.

Upon the switching control signal SW being asserted and upon the high-side switching signal HS and the mode control signal MD4 being de-asserted, the NAND-gate 250 de-asserts the signal LS_CTRL and asserts the signal LS_CTRL' via the inverter 254. Therefore, the N-FET N9 is activated and the N-FET N10 is deactivated. As a result, the node 252 has a logic-low state (e.g., approximately $-V_{OUT}$) and the node 256 has a logic-high state (e.g., approximately $V_{IN}$ minus $V_{OUT}$). The logic-high state of the node 256 is thus buffered by the OTA 124 to activate the low-side output stage 104. Upon the switching control signal SW being de-asserted or upon the high-side switching signal HS or the mode control signal MD4 being asserted, the NAND-gate 250 asserts the signal LS_CTRL and de-asserts the signal LS_CTRL' via the inverter 254. Therefore, the N-FET N9 is deactivated and the N-FET N10 is activated. As a result, the node 252 has a logic-high state (e.g., approximately $V_{IN}$ minus $V_{OUT}$) and the node 256 has a logic-low state (e.g., approximately $-V_{OUT}$). The logic-low state of the node 256 is thus buffered by the OTA 124 to deactivate the low-side output stage 104

It is to be understood that the level-shifter circuit 122 is configured to provide the appropriate bias voltage for the low-side output stage 104, regardless of the operation mode of the reconfigurable regulator system 100. For example, in the buck switching and boost switching regulator modes, the third connection terminal 110 can have a voltage magnitude of approximately 0 volts. Therefore, the level-shifter circuit 122 can provide the input to the OTA buffer 124 at the node 256 switching between approximately 0 and 5 volts (i.e., $V_{IN}$) in response to a switching control signal SW switching between approximately 0 and 5 volts (i.e., $V_{IN}$).

The OTA buffer 124 has a non-inverting input that is coupled to the node 256 and an inverting input that is electrically coupled to its output. The output thus provides the low-side switching signal LS that is provided to the low-side output stage 104. In the example of FIG. 6, the OTA buffer 124 is referenced to a high voltage rail 258 and to the third connection terminal 110 as a low voltage rail. As an example, the OTA buffer 124 can include a rail-to-rail input stage and a rail-to-rail class-AB output stage. Therefore, the OTA buffer 124 is configured to drive the signal that is provided at the node 256 to generate the low-side switching signal LS at a magnitude that is sufficient to achieve sufficient switching efficiency of the low-side output stage 104.

The low-side driver 114 also includes the rail select switch 260. Similar to as described above in the example of FIG. 7, the rail select switch 260 is a switch that can couple the high voltage rail 258 to one of the input voltage $V_{IN}$ and the output voltage $V_{OUT}$ in response to the signal RS generated by the power monitor 140 demonstrated in the example of FIG. 6. The signal RS can be disabled (e.g., logic-low or zero volts) in the buck switching and negative regulator modes, such that the high voltage rail 258 is always coupled to the input voltage $V_{IN}$ in the buck switching and negative regulator modes.

However, in the boost switching regulator mode, the power monitor 140 can assert the signal RS (e.g., a logic-high) to switch the high voltage rail 258 from the input voltage $V_{IN}$ to the output voltage $V_{OUT}$. Therefore, the low-side output stage 104 can be activated with a voltage magnitude that is approximately equal to the output voltage VOUT to reduce the on-state resistance $R_{DS\_ON}$ and to improve regulator efficiency, similar to as described above in the example of FIG. 7.

As described above, the signal mode control signal MD4 is provided to the third input of the NAND-gate 250. As an example, the mode controller 136 can decode the mode select signal MODE corresponding to the linear regulator mode to assert the signal MD4. As a result, the asserted signal MD4, indicating operation of the reconfigurable regulator system 100 in the linear regulator mode, asserts the signal LS_CTRL and de-asserts the signal LS_CTRL'. As a result, the low-side switching signal LS is held at a logic-low state, such that the low-side output stage 104 remains deactivated during the linear regulator mode. Accordingly, the low-side driver 114 is substantially deactivated upon the reconfigurable regulator system 100 being configured in the linear regulator mode.

It is to be understood that the low-side driver 114 is not intended to be limited to the example of FIG. 9. For instance, the level-shifter circuit 122 and the OTA buffer 124 are not limited to the configurations demonstrated in the example of FIG. 9, but other level-shifting and driving configurations can be implemented in the low-side driver 114. As another example, the manner in which the low-side driver 114 is deactivated in the linear regulator mode is not limited to the use of the NAND-gate 250. Thus, other arrangements of switches and/or transistors can be implemented to deactivate the low-side driver 114.

Figure 10:
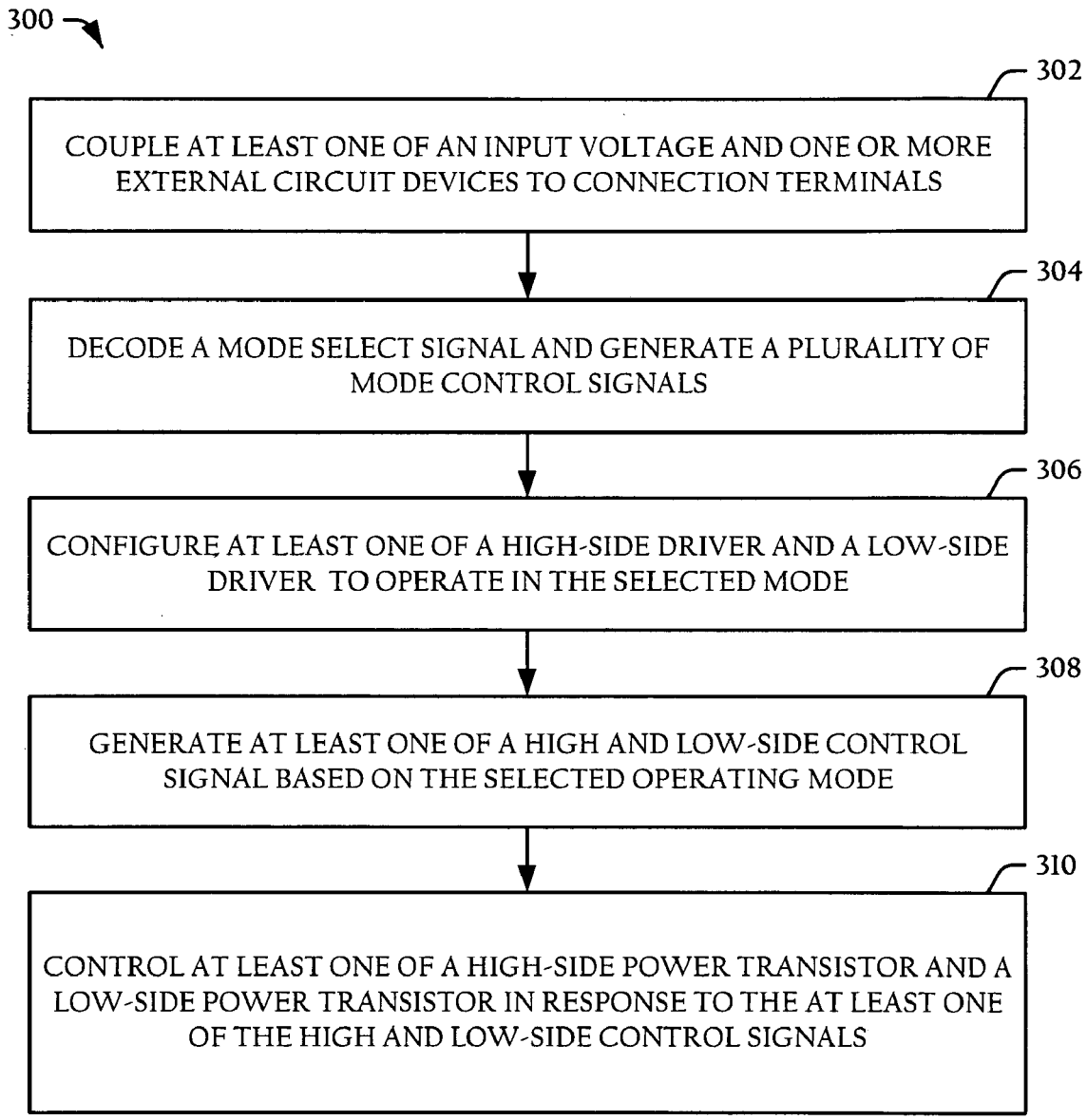
FIG. 10 illustrates an example of a method for controlling related power in accordance with an aspect of the invention.

In view of the foregoing structural and functional features described above, certain methods will be better appreciated with reference to FIG. 10. It is to be understood and appreciated that the illustrated actions, in other embodiments, may occur in different orders and/or concurrently with other actions. Moreover, not all illustrated features may be required to implement a method.

FIG. 10 illustrates an example of a method 300 for configuring a reconfigurable regulator system in accordance with an aspect of the invention. The reconfigurable regulator system can be implemented as an IC, such as described herein. At 302, at least one of an input voltage and one or more external circuit devices are coupled to at least one of a first connection terminal, a second connection terminal, and a third connection terminal. The configuration of the input voltage and/or the external circuit devices can correspond to a mode of operation of the reconfigurable power supply system, such as to operate in one of a buck switching regulator mode, boost switching regulator mode, negative switching regulator mode, and linear regulator mode.

At 304, a mode select signal corresponding to a selected operating mode is decoded to generate a plurality of mode control signals. The selected operating mode can be one of the buck switching, boost switching, negative switching, and linear regulator mode. The mode select signal can be a multi-bit control signal that can be generated from EEPROM, such as provided during fabrication of the reconfigurable regulator system, or can be provided through external connections. The mode control signals can be resultant digital signals of the decoded mode selection signal.

As one example, two bits can be employed for setting up all four regulator configurations, such as by using two external pins for the mode control. Alternatively, an internal two-bit EPROM can be employed for implementing the mode control. For example, since for a Servo IC, the EPROM is usually only programmed after PORZ="high" during the wafer test or before the IC implementing the regulator is operated, an external voltage can be fed to the regulator output node and make PORZ="high." The PORZ="high" indicates that all the power supplies and the regulators are ready. This external voltage thus can be employed to program the EPROM and properly set up the control mode for desired configurable operation.

At 306, at least one of a high-side driver and a low-side driver can be configured to operate in the selected operating mode based on the mode control signals. For instance, the high-side driver can be configured to switch between different predetermined high voltage rails in the boost switching regulator mode. Alternatively, the high and low-side drivers both can be substantially deactivated in the linear regulator mode.

At 308, at least one of a high and low-side control signal is generated based on the selected operating mode. The high and low-side control signals can be generated by the respective high and low-side drivers in the buck switching, boost switching, or negative regulator mode as switching signals, such that the reconfigurable regulator circuit operates as a switching regulator. The high-side control signal can be an analog error voltage generated by an error amplifier based on a relative magnitude of the output voltage and a reference voltage.

At 310, at least one of a high-side power transistor interconnecting the first and second connection terminals and a low-side power transistor interconnecting the second and third connection terminals is controlled in response to the at least one of the high and low-side control signals to regulate an output voltage. Each of the high and low-side power transistors can include an arrangement of transistors connected in parallel, with one having a substantially size and lower threshold than the other, such as shown and described with respect to FIG. 8. The other transistor can be an LDMOS power transistor. The high and low-side power transistors can alternately switch to provide a current flow through an inductor in the buck switching, boost switching, and negative switching modes, or the high-side power transistor can be operated in the linear region in response to the error voltage in the linear regulator mode.

What have been described above are examples of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications, and variations that fall within the spirit and scope of this application including the appended claims.

What is claimed is:

1. A regulator system comprising:
    a high-side power transistor electrically connected between a first node and a second node, the high-side power transistor being controlled by a high-side control signal;
    a low-side power transistor electrically connected between the second node and a third node, the low-side power transistor being controlled by a low-side control signal;
    a mode controller configured to provide at least one mode control signal having a value to enable operation of the regulator system in each of a buck switching regulator mode, a boost switching regulator mode, a negative switching regulator mode, and a linear regulator mode, the mode being selected depending on the value of the mode control signal, the regulator system utilizing at least one of the high-side power transistor and the low-side power transistor to operate in the selected mode depending on at least one of an input voltage and an arrangement of external circuitry that are electrically coupled to at least one of the first node, the second node, and the third node to provide a regulated output voltage;
a high-side driver configured to generate the high-side control signal as a high-side switching signal that is provided to the high-side power transistor in each of the buck switching, boost switching, and negative switching regulator modes; and
a low-side driver configured to generate the low-side control signal as a low-side switching signal that is provided to the low-side power transistor in each of the buck switching, boost switching, and negative switching regulator modes, the high-side power transistor and the low-side power transistor cooperate to regulate the output voltage based on the high-side switching signal and the low-side switching signal,
wherein the low-side driver further comprises a level-shifter circuit configured to generate a level-shifted switching signal based on the low-side switching signal, the level-shifted switching signal having a magnitude sufficient to deactivate the low-side power transistor if a source voltage of the low-side power transistor has a magnitude that is less than or equal to zero volts.

2. The system of claim 1, further comprising:
an error amplifier circuit configured to generate an error voltage based on a magnitude of the output voltage relative to a reference voltage; and
a switching circuit configured to set a duty-cycle of the high and low-side switching signals based on a magnitude of the error voltage.

3. The system of claim 2, further comprising at least one switch device configured to deactivate the high-side driver and the high-side power transistor and to couple the error voltage directly to a control input of the high-side power transistor when the regulator system operates in the linear regulator mode based on the value of the mode control signal, such that the regulator system is configured to receive the input voltage at the first node and to provide the output voltage at the second node as a linear function of the input voltage depending on a magnitude of the reference voltage.

4. The system of claim 1, further comprising:
an inductor coupled between the second node and an output node;
a low voltage rail coupled to the third node; and
an output capacitor coupled between the output voltage and the low voltage rail;
wherein the mode controller provides the mode control signal with a value to indicate operation in the buck switching regulator mode, such that a regulated magnitude of the output voltage is provided at the output node according to the high-side switching signal and the low-side switching signal.

5. The system of claim 1, further comprising:
an inductor coupled between the second node and the input voltage;
a low voltage rail coupled to the third node; and
an output capacitor coupled between the first node and the low voltage rail;
wherein the mode controller provides the mode control signal with a value to indicate operation in the boost switching regulator mode to provide a corresponding regulated magnitude of the output voltage at the first node according to the high-side switching signal and the low-side switching signal.

6. The system of claim 1, further comprising:
an inductor coupled between the second node and a low voltage rail; and
an output capacitor coupled between the third node and the low voltage rail;
wherein the input voltage is coupled to the first node, and wherein the mode controller provides the mode control signal with a value to indicate operation in the negative switching regulator mode to provide the output voltage with a corresponding regulated negative magnitude at the third node according to the high-side switching signal and the low-side switching signal.

7. The system of claim 1, further comprising:
a fourth node that is coupled to the high-side driver;
an external capacitor that interconnects the second node and the fourth node, the external capacitor being configured to be charged by the input voltage during an off-state of the high-side power transistor and to provide a boosted activation voltage to the high-side power transistor during an on-state of the high-side power transistor, the boosted activation voltage having a magnitude that is referenced to approximately the input voltage for efficient activation of the high-side power transistor.

8. The system of claim 1, wherein the low-side driver further comprises an operational transconductance amplifier (OTA) configured to buffer the level-shifted switching signal to provide a buffered level-shifted switching signal to the low-side power transistor.

9. A regulator system comprising:
a high-side power transistor electrically connected between a first node and a second node, the high-side power transistor being controlled by a high-side control signal;
a low-side power transistor electrically connected between the second node and a third node, the low-side power transistor being controlled by a low-side control signal;
a mode controller configured to provide at least one mode control signal having a value to enable operation of the regulator system in each of a buck switching regulator mode, a boost switching regulator mode, a negative switching regulator mode, and a linear regulator mode, the mode being selected depending on the value of the mode control signal, the regulator system utilizing at least one of the high-side power transistor and the low-side power transistor to operate in the selected mode depending on at least one of an input voltage and an arrangement of external circuitry that are electrically coupled to at least one of the first node, the second node, and the third node to provide a regulated output voltage;
a high-side driver configured to generate the high-side control signal as a high-side switching signal that is provided to the high-side power transistor in each of the buck switching, boost switching, and negative switching regulator modes; and
a low-side driver configured to generate the low-side control signal as a low-side switching signal that is provided to the low-side power transistor in each of the buck switching, boost switching, and negative switching regulator modes, the high-side power transistor and the low-side power transistor cooperate to regulate the output voltage based on the high-side switching signal and the low-side switching signal,
further comprising:
a power monitor circuit configured to provide a rail select signal based on the output voltage provided by the regulator system; and a switch device configured to couple a high voltage rail of the high-side driver to one of the input voltage and the output voltage depending on the rail select signal, the rail select signal causing the switch device to couple the high voltage rail to the input voltage in the buck switching regulator mode and the negative switching regulator mode, the rail select signal causing the switch device to couple the high voltage rail to the input voltage during an initial portion of the boost switching regulator mode and then to couple the high voltage rail to the output voltage after the output voltage has achieved a predetermined threshold voltage.

10. A regulator system comprising:

a high-side power transistor electrically connected between a first node and a second node, the high-side power transistor being controlled by a high-side control signal;

a low-side power transistor electrically connected between the second node and a third node, the low-side power transistor being controlled by a low-side control signal;

a mode controller configured to provide at least one mode control signal having a value to enable operation of the regulator system in each of a buck switching regulator mode, a boost switching regulator mode, a negative switching regulator mode, and a linear regulator mode, the mode being selected depending on the value of the mode control signal, the regulator system utilizing at least one of the high-side power transistor and the low-side power transistor to operate in the selected mode depending on at least one of an input voltage and an arrangement of external circuitry that are electrically coupled to at least one of the first node, the second node, and the third node to provide a regulated output voltage, wherein at least one of the high-side power transistor and the low-side power transistor further comprises:

a first transistor, a second transistor, and a diode, wherein each of the first transistor, the second transistor, and the diode being connected in parallel between respective nodes, the second transistor having a substantially lower threshold voltage than the first transistor.

11. An integrated circuit (IC) comprising the regulator system of claim 10, wherein each of the first node, the second node and the third node is a respective pin of the IC to which the at least one of the input voltage and the arrangement of external circuitry are electrically connected depending on the operating mode of the regulator system.

12. A method for configuring a reconfigurable regulator integrated circuit (IC), the method comprising:

decoding a mode select signal corresponding to a selected operating mode of the reconfigurable regulator IC to generate a plurality of mode control signals, the selected operating mode being one of a buck switching regulator mode, a boost switching regulator mode, a negative switching regulator mode, and a linear regulator mode;

configuring the reconfigurable regulator IC in response to the plurality of mode control signals for the selected operating mode to generate at least one of a high-side control signal and a low-side control signal according to the selected operating mode; and controlling at least one of a high-side power transistor and a low-side power transistor in response to the at least one of the high-side control signal and the low-side control signal to provide a regulated output voltage in each of the buck switching regulator mode, the boost switching regulator mode, the negative switching regulator mode, and the linear regulator mode, the first power transistor interconnecting a first connection terminal and a second connection terminal, the second power transistor interconnecting the second connection terminal and a third connection terminal, the selected operating mode depending on at least one of an input voltage and one or more external circuit devices coupled to at least some of the first connection terminal, the second connection terminal, and the third connection terminal, wherein the method further comprises providing at least one of the high-side power transistor and the low-side power transistor having:

a first transistor, a second transistor, and a diode, wherein each of the first transistor, the second transistor, and the diode being connected in parallel between respective nodes, the second transistor having a substantially lower threshold voltage than the first transistor.

13. The method of claim 12, wherein decoding the mode select signal comprises decoding the mode select signal to generate the plurality of mode control signals corresponding to the buck switching regulator mode, wherein the external circuit devices comprise an inductor coupled between an output node and the second connection terminal, an output capacitor being coupled between the output node and a low voltage rail, the third connection terminal being coupled to the low voltage rail;

wherein configuring the reconfigurable regulator IC further comprises configuring a high-side driver and a low-side driver to generate the high-side control signal and the low-side control signal as respective switching signals that are provided to the respective high-side power transistor and the low-side power transistor, the high-side control signal and the low-side control signal varying according to an error voltage generated by an error amplifier circuit; and wherein controlling the at least one of the high and low-side power transistors further comprises generating the regulated output voltage at the output node relative to the low voltage rail based on the input voltage that is coupled to the first connection terminal.

14. The method of claim 12, wherein decoding the mode select signal comprises decoding the mode select signal to generate the plurality mode control signals corresponding to the boost switching regulator mode, wherein the external circuit devices comprise an inductor coupled between the input voltage and the second connection terminal, an output capacitor being coupled between the first connection terminal and a low voltage rail of the reconfigurable regulator IC, the third connection terminal being coupled to the low voltage rail;

wherein configuring the reconfigurable regulator IC comprises configuring a high-side driver and a low-side driver to generate the high-side control signal and the low-side control signal as respective switching signals that are provided to the respective high-side power transistor and the low-side power transistor, the high-side control signal and the low-side control signal varying according to an error voltage generated by an error amplifier circuit; and wherein controlling the at least one of the high and low-side power transistors comprises generating the regulated output voltage at the first connection terminal across the output capacitor based on the input voltage.

15. The method of claim 12, wherein decoding the mode select signal comprises decoding the mode select signal to generate the mode control signals corresponding to the negative switching regulator mode, wherein the external circuit devices comprise an inductor coupled between the second connection terminal and a low voltage rail of the reconfigurable regulator IC, an output capacitor being coupled between the third connection terminal and the low voltage rail, the first connection terminal being coupled to the input voltage;

wherein configuring the reconfigurable regulator IC further comprises configuring a high-side driver and a low-side driver to generate the high-side control signal and the low-side control signal as respective switching signals that are provided to the respective high-side power transistor and the low-side power transistor, the high-side control signal and the low-side control signal varying according to an error voltage generated by an error amplifier circuit; and wherein controlling the at least one of the high and low-side power transistors further comprises generating the regulated output voltage as a negative output voltage relative to the low voltage rail at the third connection terminal based on the input voltage.

16. The method of claim 12, wherein decoding the mode select signal comprises decoding the mode select signal to generate the mode control signals corresponding to the linear regulator mode, wherein an input voltage is provided at the first connection terminal and an output of the reconfigurable regulator IC is provided at the second connection terminal, wherein configuring the reconfigurable regulator IC further comprises:

decoupling a control input of the high-side power transistor from a high-side driver, and coupling the control input of the high-side power transistor to an error voltage generated by an error amplifier circuit; and wherein controlling the at least one of the high and low-side power transistors further comprises:

deactivating the low-side power transistor; and controlling the high-side power transistor to generate the output voltage at the second connection terminal as a linear function of the input voltage.

17. A regulator integrated circuit (IC) that is configurable to operate in a selected operating mode comprising a buck switching regulator mode, a boost switching regulator mode, a negative switching regulator mode, and a linear regulator mode, the regulator IC comprising:

means for coupling at least one of an input voltage and a plurality of external circuit devices to the regulator IC, the at least one of the input voltage and the plurality of external circuit devices being configured to generate an output voltage based on the operation of at least one of a high-side power transistor and a low-side power transistor;

means for generating a high-side switching signal to control the high-side power transistor in each of the buck switching regulator mode, the boost switching regulator mode, the negative switching regulator mode;

means for generating a low-side switching signal to control the low-side power transistor in each of the buck switching regulator mode, the boost switching regulator mode, the negative switching regulator mode;

means for generating an error voltage based on a magnitude of an output voltage relative to a reference voltage, the error voltage being provided to the means for generating the high and low-side switching signals in each of the buck switching regulator mode, the boost switching regulator mode, the negative switching regulator mode, and to the high-side power transistor in the linear regulator mode to regulate the output voltage according to the selected operating mode;

means for decoding a mode select signal corresponding to the selected operating mode of the regulator IC to generate a plurality of mode control signals, the selected operating mode being one of the buck switching regulator mode, the boost switching regulator mode, the negative switching regulator mode, and the linear regulator mode; and means for configuring the means for generating the high-side switching signal, the low-side switching signal, and the means for generating the output voltage for the regulator IC to operate in the selected operating mode, wherein at least one of the high-side power transistor and the low-side power transistor further comprises:

a first transistor, a second transistor, and a diode, wherein each of the first transistor, the second transistor, and the diode being connected in parallel between respective nodes, the second transistor having a substantially lower threshold voltage than the first transistor.

* * * * *